United States Patent [19]
Fukao

[11] Patent Number: 6,161,964
[45] Date of Patent: Dec. 19, 2000

[54] SHAFT AND SLEEVE ASSEMBLY STRUCTURE FOR AUTOMATIC TRANSMISSION CAPABLE OF BEING ASSEMBLED WITHOUT DAMAGE OF SEAL RING

[75] Inventor: Tadashi Fukao, Hamura, Japan

[73] Assignee: Koyo Seiko Co., Ltd., Osaka, Japan

[21] Appl. No.: 09/311,279

[22] Filed: May 14, 1999

[30] Foreign Application Priority Data

May 18, 1998 [JP] Japan ................................. 10-134993

[51] Int. Cl.[7] ..................................................... F16C 43/04
[52] U.S. Cl. ......................... 384/560; 384/489; 384/564; 384/584
[58] Field of Search ..................................... 384/473, 477, 384/489, 559, 560, 564, 569, 572, 584

[56] References Cited

U.S. PATENT DOCUMENTS

| | | | |
|---|---|---|---|
| 3,813,136 | 5/1974 | Pitner | 384/559 |
| 4,350,397 | 9/1982 | Cornish et al. | 384/569 |
| 5,529,402 | 6/1996 | Murphy | 384/564 |

*Primary Examiner*—Thomas R. Hannon
*Attorney, Agent, or Firm*—Wenderoth, Lind & Ponack, L.L.P.

[57] ABSTRACT

There is provided a shaft and sleeve assembly structure for an automatic transmission which can be assembled by inserting a shaft into a needle roller bearing so that a seal ring fitted to the shaft is allowed to pass through inside of the needle roller bearing without causing a seal ring to be damaged. In this assembly structure, in the process of inserting the shaft 11 into the needle roller bearing 25, the seal ring 22 fitted to the shaft 11, upon contact with a radially inner end portion 36A of a flange portion 36 of an outer ring 33 of the needle roller bearing 25, is allowed to pass through the radial inside of the flange portion 36 smoothly along a curved surface 37 bent axially inward. Further, the seal ring 22 fitted to the shaft 11, upon contact with axial one end of a cage 32 of the needle roller bearing 25, is allowed to pass through the radial inside of a flange portion 38 provided at axial one end of the cage 32 smoothly along a curved surface 41 of the flange portion 38.

5 Claims, 3 Drawing Sheets

SHAFT AND SLEEVE ASSEMBLY STRUCTURE FOR AUTOMATIC TRANSMISSION CAPABLE OF BEING ASSEMBLED WITHOUT DAMAGE OF SEAL RING

BACKGROUND OF THE INVENTION

The present invention relates to a shaft and sleeve assembly structure to be used, for example, in automatic transmissions of automobiles.

Conventionally, in this type of shaft and sleeve assembly structure to be used in automatic transmissions of automobiles, as shown in FIG. 6, a shaft 62 is inserted into a sleeve 61, and a needle roller bearing 63 is fitted between the shaft 62 and the sleeve 61.

In this structure, an axial hole 65 bored axially from an end portion 62A of the shaft 62 is formed, and a radial through hole 66 radially extending through from a specified axial position of the axial hole 65 is bored. Then, working oil is supplied to the needle roller bearing 63 through the axial hole 65 and the radial through hole 66. For this supply, the axial hole 65 and the radial through hole 66 serve as an oil passage, and a seal ring 67 is fitted between the end portion 62A of the shaft 62 and the sleeve 61 so that the working oil does not flow between the end portion 62A of the shaft 62 and the sleeve 61. This seal ring 67 is a rubber member made of urethane rubber or the like.

However, the prior art structure as described above has a problem that when the shaft 62 is inserted inside the needle roller bearing 63, the seal ring 67 fitted to the shaft end portion 62A tends to strike against an axial end portion 73A of a cage 73 as shown in FIG. 5A, making the seal ring 67 damage. There is a further problem that the seal ring 67 tends to catch on an inner end 72A of a flange portion 72 bent radially inward of an outer ring 71, making the seal ring 67 damaged.

Furthermore, when the end portion 73A of the cage 73 is bent radially outward so as to be hidden behind the outer ring flange portion 72 as shown in FIG. 5B so that the seal ring 67 does not strike against the end portion 73A of the cage 73, there is a problem that the seal ring 67 may enter into between the outer ring flange portion 72 and an end face 75A of a roller 75, making the seal ring 67 damaged.

In addition, if the diameter of the shaft end portion 62A is made smaller than the diameter of a shaft central portion 62B as shown in FIG. 4, then the seal ring 67 can be prevented from striking against the needle roller bearing 63 to some extent. However, too small a diameter of the end portion 62A would cause the structure to lack strength.

SUMMARY OF THE INVENTION

Therefore, an object of the present invention is to provide a shaft and sleeve assembly structure for automatic transmissions which can be assembled by inserting the shaft into the needle roller bearing so that the seal ring fitted to the shaft is allowed to pass through the inside of the needle roller bearing without causing the seal ring to be damaged.

In order to achieve the above object, the present invention provides a shaft and sleeve assembly structure for an automatic transmission, comprising: a shaft of the automatic transmission having inside an oil passage for working oil to pass through; a sleeve to which the shaft is fitted inside, a needle roller bearing which is placed between the shaft and the sleeve and to which the working oil is fed from the oil passage of the shaft; and a seal ring fitted between the shaft and the sleeve at a position between an end of the shaft and the needle roller bearing, wherein
the needle roller bearing is so structured that the seal ring is allowed to pass through inside of the needle roller bearing without being damaged.

In an embodiment, the needle roller bearing comprises an outer ring having a curved surface bent axially inward on an axially outer side of a radially inner end portion of a flange portion bent radially inward at axial one end.

In the invention of this embodiment, in the process of inserting the shaft from the axial one end of the needle roller bearing, when the seal ring fitted to the shaft has struck against the radial inner end portion of the outer ring flange portion of the needle roller bearing, the seal ring is allowed to smoothly pass through the radial inside of the flange portion along the curved surface bent axially inward of the radial inner end portion.

Therefore, according to this embodiment, the assembly structure can be assembled by inserting the shaft into the needle roller bearing so that the seal ring fitted to the shaft is allowed to pass through the inside of the needle roller bearing without causing the seal ring to be damaged.

In an embodiment, the needle roller bearing comprises a cage having a curved surface on an outside of a bent portion of a flange portion bent radially outward at axial one end.

In this embodiment, in the process of inserting the shaft from an axial one end of the needle roller bearing, when the seal ring fitted to the shaft has struck against the axial one end of the cage of the needle roller bearing, the seal ring is allowed to smoothly pass through the radial inside of the flange portion along the curved surface of the flange portion provided at the axial one end of the cage.

Therefore, according to this embodiment, the assembly structure can be assembled by inserting the shaft into the needle roller bearing so that the seal ring fitted to the shaft is allowed to pass through the inside of the needle roller bearing without causing the seal ring to be damaged.

In an embodiment, the needle roller bearing comprises an outer ring having a curved surface bent axially inward on an axially outer side of a radially inner end portion of a flange portion bent radially inward at axial one end as well as a cage having a curved surface on an outside of abent portion of a flange portion bent radially outward at the axial one end.

In this embodiment, in the process of inserting the shaft from the axial one end of the needle roller bearing, when the seal ring fitted to the shaft has struck against the radial inner end portion of the outer ring flange portion of the needle roller bearing, the seal ring is allowed to smoothly pass through the radial inside of the flange portion of the outer ring along the curved surface bent axially inward of the radial inner end portion. Further, when the seal ring fitted to the shaft has struck against the axial one end of the cage of the needle roller bearing, the seal ring is allowed to smoothly pass through the radial inside of the flange portion of the cage along the curved surface of the flange portion provided at the axial one end of the cage.

Therefore, according to this embodiment, the assembly structure can be assembled by inserting the shaft into the needle roller bearing so that the seal ring fitted to the shaft is allowed to pass through the inside of the needle roller bearing without causing the seal ring to be damaged.

In an embodiment, the flange portion of the cage bent radially outward at the axial one end is spaced from the flange portion of the outer ring bent radially inward at the axial one end with a specified gap size, the gap size being set smaller than axial size of the seal ring, and an inner diameter of the flange portion of the outer ring is set equal to or less than an outer diameter of the curved surface of the cage.

In this embodiment, because the inner diameter of the flange portion of the outer ring is set equal to or less than the outer diameter of the curved surface of the cage, the seal ring that has passed the curved surface of the flange portion of the outer ring is allowed to smoothly pass subsequently through the curved surface of the flange portion of the cage while keeping contact with the curved surface. Also, since the size of the gap between the flange portion of the outer ring and the flange portion of the cage is made smaller than the axial size of the seal ring, the seal ring of the shaft is securely prevented from fitting into the gap.

Therefore, according to this embodiment, the assembly structure can be assembled by inserting the shaft into the needle roller bearing so that the seal ring fitted to the shaft is allowed to smoothly pass through the inside of the outer ring of the needle roller bearing as well as the inside of the cage without causing the seal ring to be damaged.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in more detail with reference to embodiments illustrated in the accompanying drawings.

Figure 1:
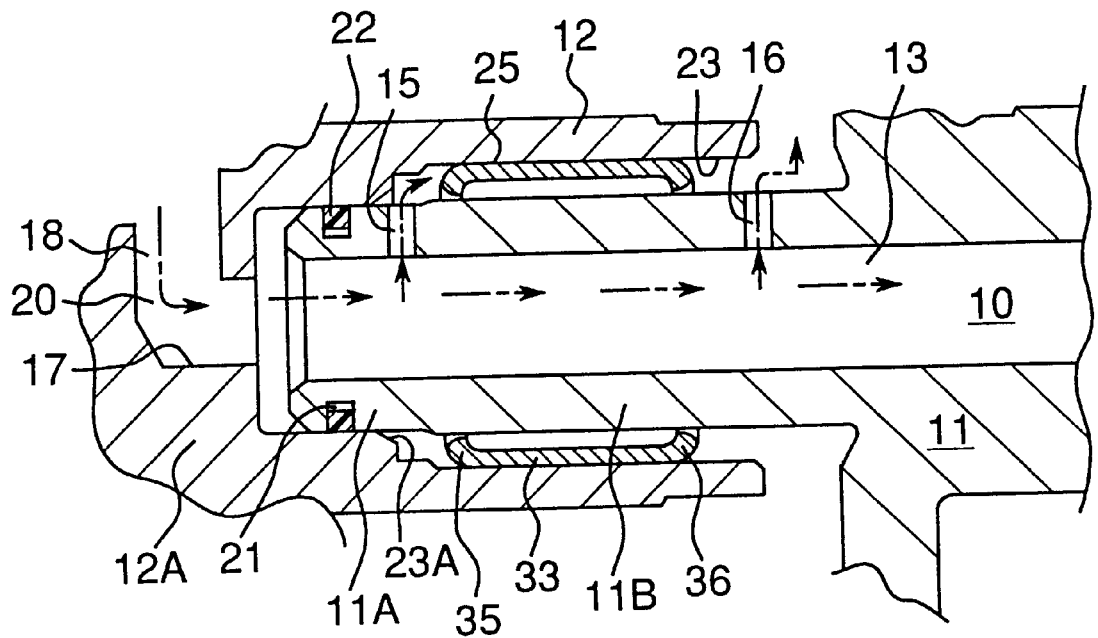
FIG. 1 is a sectional view showing an embodiment of a shaft and sleeve assembly structure for an automatic transmission according to the present invention.

FIG. 1 shows an embodiment of a shaft and sleeve assembly structure for an automatic transmission according to the present invention. This embodiment comprises a shaft 11 having inside an oil passage 10 for working oil to pass through, and a sleeve 12 to which the shaft 11 is fitted inside. The oil passage 10 comprises an axial hole 13 bored axially from an end portion 11A of the shaft 11, and radial through holes 15, 16 formed so as to be axially spaced from each other with a specified spacing.

Meanwhile, an axial hole 17 formed generally concentric with the axial hole 13 of the shaft 11 as well as a radial hole 18 perpendicularly extending from the axial hole 17 are formed in a bottom portion 12A of the sleeve 12 confronting the end portion 11A of the shaft 11. These axial hole 17 and radial hole 18 constitute a sleeve-side oil passage 20.

Then, the end portion 11A of the shaft 11 is slightly smaller than a central portion 11B. A circumferential groove 21 is formed on the outer circumference of the end portion 11A, and a seal ring 22 is fitted to this circumferential groove 21. The seal ring 22 is a rubber member made of urethane rubber or the like. Also, a specified radial gap is formed between the central portion 11B and an inner circumferential surface 23 of the sleeve 12 and between the two radial through holes 15 and 16 of the shaft 11. A needle roller bearing 25 is press fitted into this gap. The needle roller bearing 25 has an outer ring 33, and this outer ring 33 has two flange portions 35 and 36 bent radially inward at axial both ends.

In this shaft and sleeve assembly structure for an automatic transmission, working oil passes through the oil passage 20 of the sleeve 12 and the oil passage 10 of the shaft 11, as shown by one-dot chain line in FIG. 1, to lubricate the needle roller bearing 25.

Figure 2A:
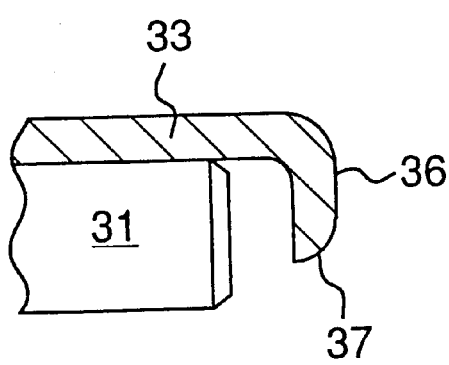
FIG. 2A is a view showing a modification example of a needle roller bearing of the embodiment.
Figure 2B:
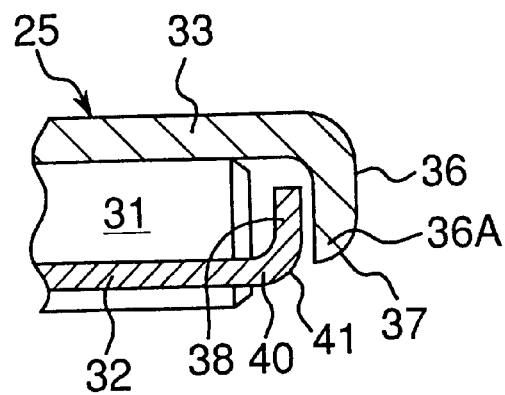
FIG. 2B is a view showing a needle roller bearing of the embodiment.

Referring next to FIG. 2B, the structure of the needle roller bearing 25 is explained. This needle roller bearing 25 comprises a roller 31, a cage 32 for retaining the roller 31, and an outer ring 33. Out of the flange portions 35, 36 at axial both ends of the outer ring 33, the flange portion 36 positioned farther from the seal ring 22 has a curved surface 37 curved axially inward on the axially outer side of a radially inner end portion 36A of the flange portion 36. Further, the cage 32 has a flange portion 38 bent radially outward on the axially inner side of the flange portion 36 of the outer ring 33. This flange portion 38 has a curved surface 41 formed outside a bent portion 40.

Figure 3:
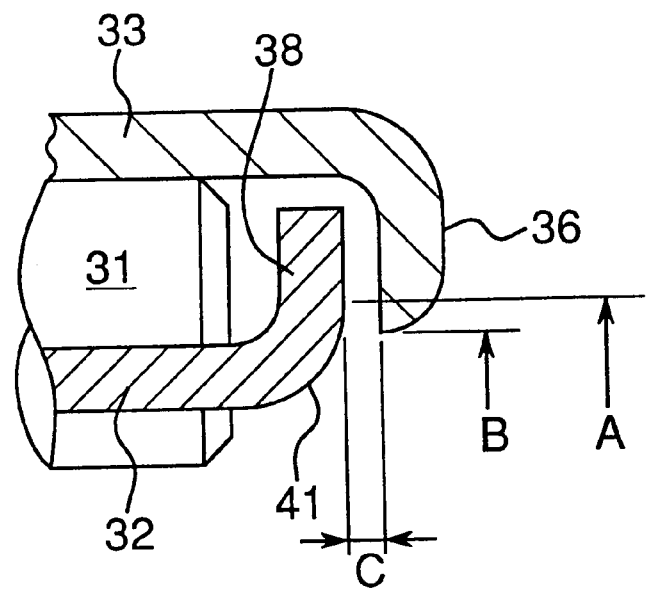
FIG. 3 is a view showing in detail the dimensional relation of the needle roller bearing of the embodiment.
Figure 4:
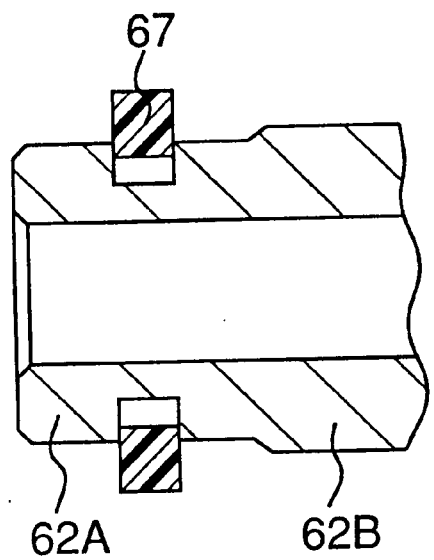
FIG. 4 is a view showing the shape of a shaft end portion of an automatic transmission.
Figure 5A:
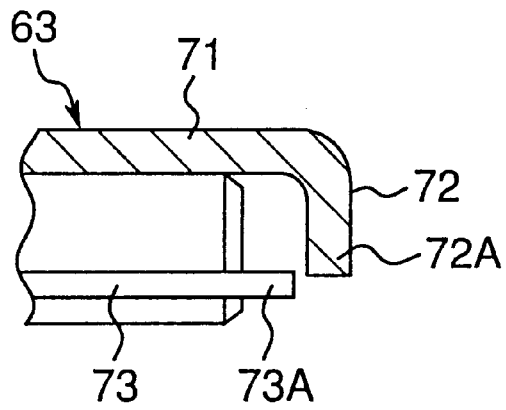
FIG. 5A is a view showing a needle roller bearing of the prior art.
Figure 5B:
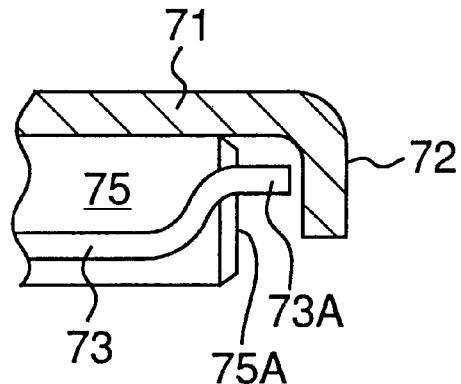
FIG. 5B is a view showing another needle roller bearing of the prior art.
Figure 6:
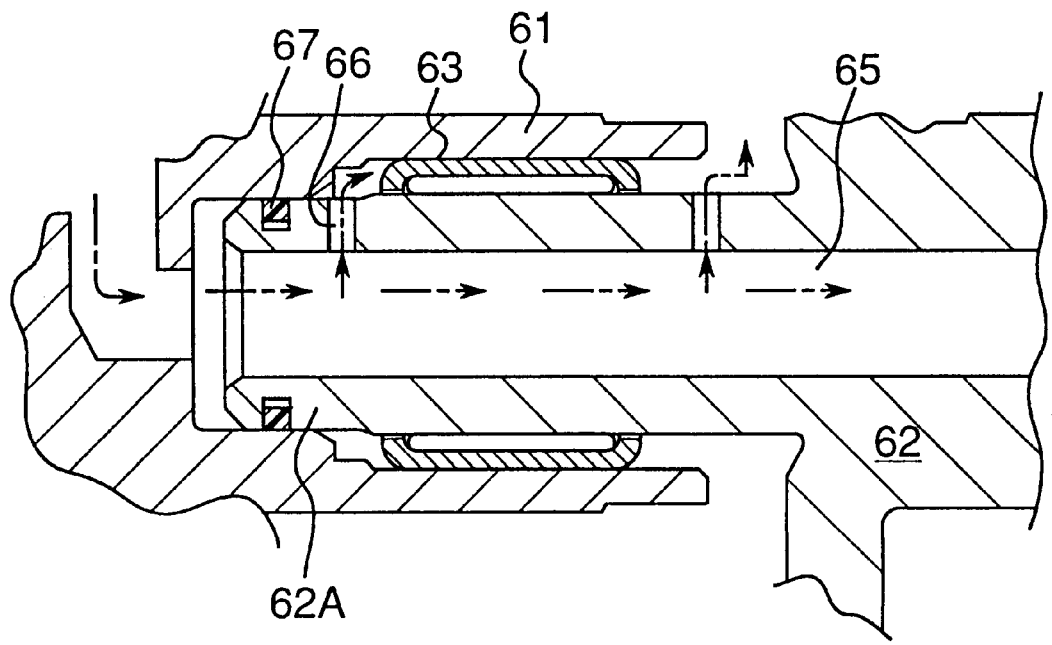
FIG. 6 is a sectional view showing a shaft and sleeve assembly structure for an automatic transmission according to the prior art.

Referring next to FIG. 3, the relationship between the flange portion 36 of the outer ring 33 and the flange portion 38 of the cage 32 is explained. The flange portion 36 and the flange portion 38 are spaced from each other with an axial gap C, and this axial gap C is set smaller than the axial size of the seal ring 22. Besides, inner diameter B of the flange portion 36 of the outer ring 33 is set, in this case, to not more than outer diameter A of the curved surface 41 of the flange portion 38.

The shaft and sleeve assembly structure for an automatic transmission having the above-described constitution is assembled in the following way. First, the seal ring 22 is fitted to the circumferential groove 21 formed on the outer circumference of the end portion 11A of the shaft 11. Then the shaft 11 is inserted inside the needle roller bearing 25 fitted to the inner circumferential surface 23 of the sleeve 12. During this insertion, the seal ring 22 fitted to the end portion 11A of the shaft 11 first comes into contact with the curved surface 37 of the radially inner end portion 36A of the flange portion 36 of the outer ring 33 of the needle roller bearing 25 as shown in FIG. 2B. Upon this contact, the seal ring 22 smoothly slides axially along the curved surface 37 while slightly contracting radially, thus being allowed to pass through the radial inside of the flange portion 36. Next, the seal ring 22 makes contact with the curved surface 41 of the bent portion 40 of the flange portion 38 of the cage 32, and smoothly slides axially while slightly contracting radially, thus being allowed to pass the bent portion 40 of the flange portion 38. Then, by further insertion of the shaft 11, the seal ring 22 is further inserted axially, passing the roller bearing 25, going beyond a reduced-in-diameter surface 23A of the inner circumferential surface 23 of the sleeve, and thus reaching a specified position within the sleeve 12.

As shown above, according to this assembly structure, when the seal ring 22 fitted to the shaft 11 is passed through the needle roller bearing 25, the seal ring 22 is freed from the possibility of being damaged by contact between the roller bearing 25 and the seal ring 22.

Also, according to this assembly structure, since the axial gap C between the flange portion 36 of the outer ring 33 of the roller bearing 25 and the flange portion 38 of the cage 32 is set smaller than the axial size of the seal ring 22, the seal ring 22 of the shaft 11 is prevented from fitting in between the outer ring flange portion 36 and the cage flange portion 38. Further, since the inner diameter B of the outer ring flange portion 36 is set not more than the outer diameter A of the curved surface 41 of the cage flange portion 38, the seal ring 22 that has come beyond the outer ring flange portion 36 can be received by the succeeding curved surface 41 and smoothly slid.

Therefore, according to this embodiment, the assembly structure can be assembled by inserting the shaft 11 into the needle roller bearing 25 so that the seal ring 22 fitted to the shaft 11 is allowed to pass through the inside of the needle roller bearing 25 without causing the seal ring 22 to be damaged.

The above embodiment has been described on a case in which the needle roller bearing 25 has the cage 32. Otherwise, it is also possible to adopt a needle roller bearing equipped with no cages as shown in FIG. 2A.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shaft and sleeve assembly structure for an automatic transmission, comprising: a shaft of the automatic transmission having inside an oil passage for working oil to pass through; a sleeve to which the shaft is fitted inside, a needle roller bearing which is placed between the shaft and the sleeve and to which the working oil is fed from the oil passage of the shaft; and a seal ring fitted between the shaft and the sleeve at a position between an end of the shaft and the needle roller bearing, wherein the needle roller bearing is so structured that the seal ring is allowed to pass through inside of the needle roller bearing without being damaged.

2. The shaft and sleeve assembly structure for an automatic transmission according to claim 1, wherein the needle roller bearing comprises a cage having a curved surface on an outside of a bent portion of a flange portion bent radially outward at axial one end.

3. The shaft and sleeve assembly structure for an automatic transmission according to claim 1, wherein the needle roller bearing comprises an outer ring having a curved surface bent axially inward on an axially outer side of a radially inner end portion of a flange portion bent radially inward at axial one end.

4. The shaft and sleeve assembly structure for an automatic transmission according to claim 3, wherein the needle roller bearing comprises a cage having a curved surface on an outside of a bent portion of a flange portion bent radially outward at the axial one end.

5. The shaft and sleeve assembly structure for an automatic transmission according to claim 4, wherein the flange portion of the cage bent radially outward at the axial one end is spaced from the flange portion of the outer ring bent radially inward at the axial one end with a specified gap size, the gap size being set smaller than axial size of the seal ring, and an inner diameter of the flange portion of the outer ring is set equal to or less than an outer diameter of the curved surface of the cage.

* * * * *